US006619860B1

(12) United States Patent
Simon (10) Patent No.: US 6,619,860 B1
(45) Date of Patent: Sep. 16, 2003

(54) PHOTOBOOTH FOR PRODUCING DIGITALLY PROCESSED IMAGES

(75) Inventor: Richard A. Simon, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 829 days.

(21) Appl. No.: 08/971,097

(22) Filed: Nov. 14, 1997

(51) Int. Cl.[7] .................................................. G06K 9/36
(52) U.S. Cl. ...................... 395/101; 395/113; 382/277
(58) Field of Search ................................ 395/101, 113, 395/114, 115, 116, 117; 382/277, 254, 276, 100; 352/48, 85, 87; 345/467, 473, 475; 348/239, 578; 396/2, 9, 11, 57, 282, 283, 288, 291, 308; 358/296, 501, 512, 527, 530, 1.1, 1.14, 1.15, 1.16, 1.17, 1.18

(56) References Cited

U.S. PATENT DOCUMENTS

| | | | |
|---|---|---|---|
| 4,864,410 A | | 9/1989 | Andrews et al. ............ 358/443 |
| 5,446,515 A | * | 8/1995 | Wolfe et al. .................... 396/2 |
| 5,448,694 A | * | 9/1995 | Wada et al. .................. 345/473 |
| 5,463,725 A | * | 10/1995 | Henckel et al. ............. 345/350 |
| 5,511,983 A | * | 4/1996 | Kashii et al. ................ 434/365 |
| 5,583,980 A | * | 12/1996 | Anderson .................... 345/473 |
| 5,623,581 A | | 4/1997 | Attenberg ................... 395/106 |
| 5,623,587 A | * | 4/1997 | Bulman ....................... 345/435 |
| 5,778,258 A | * | 7/1998 | Zamoyski ....................... 396/2 |
| 5,796,991 A | * | 8/1998 | Shimizu ....................... 395/500 |
| 5,810,599 A | | 9/1998 | Bishop ......................... 434/157 |
| 5,852,450 A | * | 12/1998 | Thingvold ................... 345/473 |
| 5,880,731 A | * | 3/1999 | Liles et al. .................. 345/349 |
| 6,021,417 A | | 2/2000 | Massarksy ................... 707/502 |

FOREIGN PATENT DOCUMENTS

GB  2 262 013 A  6/1993
WO  WO 91/15082  10/1991

OTHER PUBLICATIONS

R.D.T. Janssen & A.M. Vossepoel, "Adaptive Vectorization of Line Drawing Images", *Computer Vision and Image Understanding,* vol. 65, No. 1, Jan. 1997, pp. 38–56.
M.M. Chang, M.I. Sezan, A.M. Tekalp, "Adaptive Bayesian Segmentation of Color Images", Oct. 1994, *Journal of Electronic Imaging,* pp. 404–414.
C. Gu & M. Kunt, "Contour Simplification and Motion Compensated Coding", *Signal Processing: Image Communication 7,* 1995, pp. 279–296.
T. Beier & S. Neely, "Feature–Based Image Metamorphosis", *Computer Graphics,* 26, 2, Jul. 1992, pp. 35–42.
D.A. Rowland & D.I. Pettett, "Manipulating Facial Appearance through Shape and Color", *IEEE Computer Graphics and Applications,* Sep. 1995, pp. 70–76.
C.L. Huang & C.W. Chen, "Human Facial Feature Extraction for Face Interpretation and Recognition", *Pattern Recognition,* vol. 25, No. 12, 1992, pp. 1435–1444.
P.J. Benson & D.I. Pettett, "Synthesising Continuous–tone Caricatures", *Image and Vision Computing,* vol. 9, No. 2, Apr. 1991, pp. 123–129.
H. Akahori et al., "Development of Motion Image Printer", *IS & T's 50th Annual Conference,* 1996.

* cited by examiner

*Primary Examiner*—Gabriel Garcia
(74) *Attorney, Agent, or Firm*—Thomas H. Close (57) ABSTRACT

A photobooth includes an electronic camera for capturing and producing a digital image of a customer, processes the digital image to apply a special effect to the image and prints the processed digital image. A display for displaying the processed digital image to the customer produces a motion image display simulating the sequential production of the processed image while the image is being processed and printed thereby entertaining the customer during the interval while the image is being processed and printed.

13 Claims, 5 Drawing Sheets

PHOTOBOOTH FOR PRODUCING DIGITALLY PROCESSED IMAGES

FIELD OF THE INVENTION

The invention relates generally to the field of digital photography, and in particular to photobooths employing digital photography and digital image processing. More specifically, the invention relates to a photobooth that produces special artistic effects in an image using digital image processing.

BACKGROUND OF THE INVENTION

U.S. Pat. No. 4,864,410, issued Sep. 5, 1989 to Andrews et al. discloses a photobooth that captures an image of a customer, processes the image using digital image processing to produce humorous effects in the image, and prints the resulting processed images. U.S. Pat. No. 5,623,581, issued Apr. 22, 1997 to Attenberg discloses a photobooth that captures an image with a digital camera, digitally tiles the image, and prints the tiled image onto a sheet of sticker material. It is also known in the art to digitally incorporate foreground and/or background templates into an image in a photobooth.

One problem faced by the above apparatus is that the digital processing and printing of the image takes a substantial amount of time, e.g. on the order of several minutes. During this delay customers can become anxious and impatient, thereby diminishing the quality of their photographic experience and as a result, limiting the repeat use of the photobooth. There is a need therefore for an improved photobooth.

SUMMARY OF THE INVENTION

The present invention is directed to overcoming one or more of the problems set forth above. Briefly summarized, according to one aspect of the present invention, a photobooth captures and produces a digital image of a customer with an electronic camera, processes the digital image to apply a special effect to the image and prints the processed digital image. A display for displaying the processed digital image to the customer produces a motion image display, simulating the sequential production of the processed image while the image is being processed and printed, thereby entertaining the customer during the interval while the image is being processed and printed.

According to a preferred mode of practicing the invention, the special effect is a painterly effect and the motion image display simulates the painting of the image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of entertaining the customer while the image is being processed and printed and it encourages repeat use of the photobooth.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
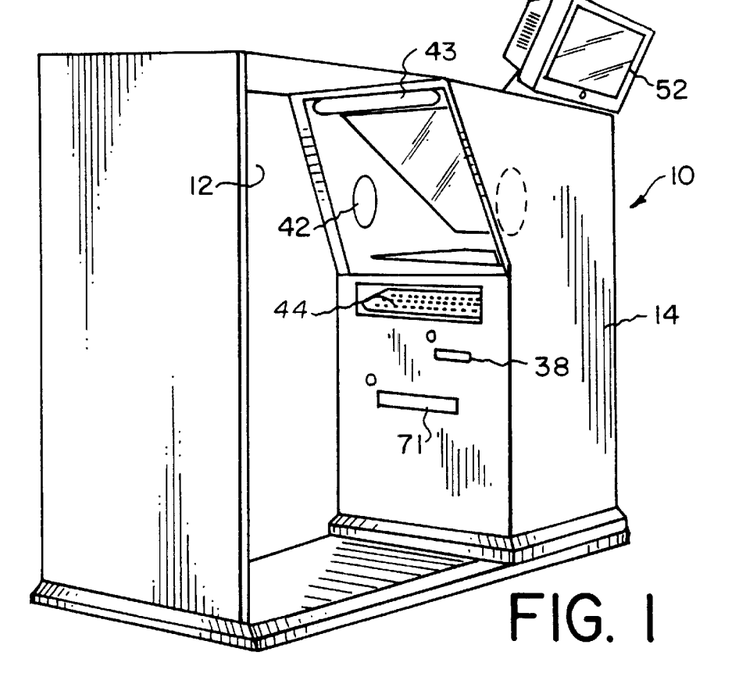
FIG. 1 is a schematic diagram showing a photobooth of the type useful with the present invention.
Figure 2:
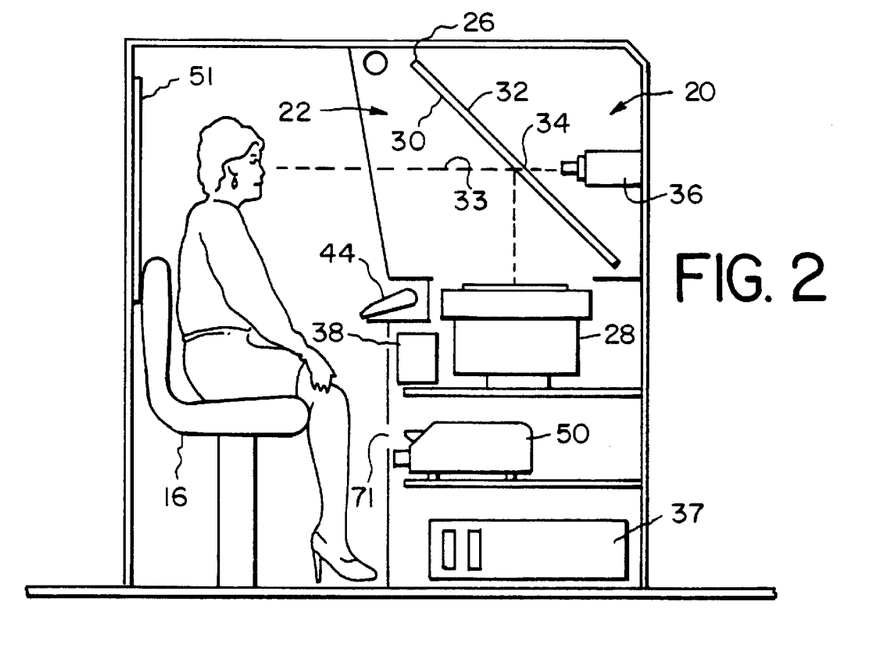
FIG. 2 is a schematic view in partial section showing the general operation of the photobooth in accordance with the present invention.

Beginning with FIGS. 1 and 2, a photobooth 10 according to the present invention is of sufficient size to accommodate the customer and the apparatus required for making photographs of the customer. The booth is self enclosed and includes an open portion 12 and a closed portion 14. The open portion includes a seat 16 that can act to align the customer properly with an electronic image capture system 20.

The closed portion 14 of the booth 10 includes an opening 22. The opening 22 faces the customer. A half silvered (two-way) mirror 26 is positioned at 45° to the optical axis 33 of the camera 36 behind the opening 22, such that when the customer looks through the opening 22 he sees the mirror 26. A display monitor 28, such as a color CRT, is mounted in the closed portion 14 below the mirror 26. The display monitor 28 is positioned at 90° with respect to the optical axis 33 of the camera 36. Light from display monitor 28 is reflected by the half silvered mirror 26 to the customer. The half silvered mirror 26 functions as a beam splitter allowing the camera 36 to take a "head-on" view of the customer and also allowing the customer to see herself on the display monitor 28. This provides the customer with feedback on her posing and allows her to adjust her pose to that which is most desirable.

The half silvered mirror 26 has a first side 30 facing the customer and a second side 32 away from the customer. The second side is painted black with the exception of a small center area 34. A video camera 36 is positioned behind the half silvered mirror 26 and in direct alignment with the small clear center area 34. Alternatively, the mirror 26 is a plain mirror having a small half silvered center portion 34.

The camera 36 creates a video image. The video image is transferred to a computer 37. The computer 37 is a computer containing a "capture card" not shown, which converts the analog signals from the video camera 36 to digital signals. The computer 37 processes the image and sends it back to the display monitor 28. The customer sees herself on the display monitor 28 after her image has been processed by the computer 37. (The digitized video image is temporarily stored in computer 37 either on a hard drive or in RAM.)

The closed portion 14 of the photobooth 10 includes a payment acceptance device 38. Forms of payment, such as credit/debit card, bill, coin or token may be provided. The payment acceptance device 38 sends a signal to the computer 37 which activates the photobooth.

The photobooth also provides for interaction with the customer to keep the customer involved during the process and to attract her attention, initially. The photobooth includes speakers 42 which can both entertain and communicate with the customer, and lights 43 which illuminate the customer to be photographed.

With particular reference to FIG. 2, the closed portion of the booth includes a color hard copy output device 50, such as an inkjet or thermal printer that is connected to the computer 37 to produce a print for the customer. The open portion 12 of the photobooth includes a chroma key screen or colored back drop 51 located behind the customer, which allows the computer 37 to automatically extract the image of the customer from the background in the manner known in the prior art. The photobooth also includes a second monitor 52 that is viewable from outside of the photobooth to entertain the customer's companions and to attract potential customers to the photobooth.

Figure 3:
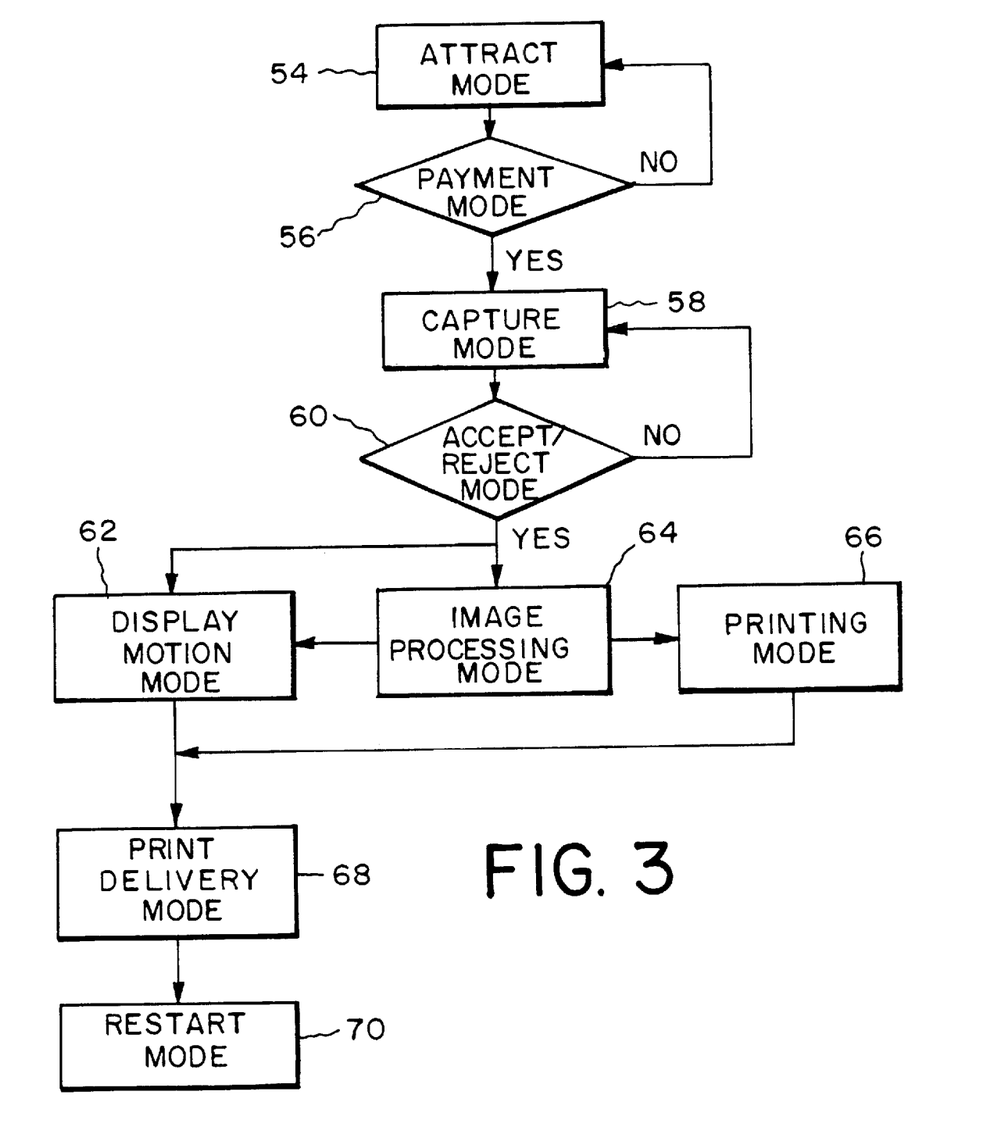
FIG. 3 is a flow chart showing the process for operating the photobooth according to the present invention.

Referring now to FIG. 3, the process of operating the photobooth according to the present invention will be described. When no customer is using the photobooth, a display (attract mode 54) is produced on the monitor 52 to attract customers. According to a preferred embodiment of the present invention, the attract mode display shows a painting of a person being generated in the same way that the painting of the customer will be displayed as described below. When a customer activates the payment acceptance device 38 (payment mode 56), the computer 37 starts the application program for capturing an image of the customer (capture mode 58). In the capture mode, the camera 36 generates real time image signals which are fed to the computer 37, processed and displayed. Instructions for operating the photobooth are displayed on the monitor, printed on a sign in the booth, and/or delivered over the speakers 42. The instructions instruct the customer to capture an image by actuating an input device, such as a push button switch or a key on a keyboard 44 located inside the photobooth out of the view of the camera, when a desired pose is achieved. Alternatively, the image capture may be initiated by the computer 37 by a countdown, or verbal instructions to say "cheese".

When an image is captured, the screen display changes from a continuously updated display to a display of the captured image. The customer is then instructed to approve or reject the captured image (image accept/reject mode 60) by actuating a key on the keyboard 44 located in the photobooth. If the image is rejected by the customer, control is returned to the capture mode 58. If the image is accepted, the computer 37 starts processing the image (image processing mode 64) and starts a motion display of the image simulating the sequential production of the processed image (display motion mode 62). The display motion mode 62 is continuously fed the partially processed image from the image processing mode 64. The purpose of this display is to entertain and distract the customer while her image is being processed and printed. The motion display of the image is slower than the actual processing of the image to allow time for both processing and printing of the image.

When the image processing is complete, the computer 37 sends the processed image to the printer 50 which initiates the printing of the processed image (printing mode 66). The motion display 62 and printing mode 66 are synchronized so that the motion display 62 and printing mode 66 are completed approximately at the same time. This ensures that the customer spends a minimum amount of time without distraction or entertainment. According to a preferred embodiment the print is delivered slightly before or simultaneously with the completion of the display motion mode 62. The print is delivered (print delivery mode 68) to the customer via a chute 71 in the photobooth, after which the computer 37 returns the system back (restart mode 70) to attract mode 54.

Artistic hand drawn or painted rendering of an individual or group of people tend to have more appeal and value to customers than regular photographic portraits. The typical person is capable of taking a photograph but not everybody is an artist. The photographic process has been so perfected that most people have experienced the capability to generate very pleasing photographs. The same cannot be said for generating aesthetic hand drawn and painted pictures. Artist rendering of an image is considered a talent whereas picture taking is a commonplace. Therefore, an artistic rendition of an image can command a premium price, even an artistic image generated by a computer from a photograph.

Image processing techniques which generate painterly effects are defined as special effect filters which give an image the appearance of having been hand drawn, sketched, or painted with artist's implements (e.g. brushes, pens, pencils, charcoal, pastels, crayons, air brush, markers, watercolor, oil paints, inks, etc.) on natural media (e.g., canvas, textured paper, etc.). According to one embodiment of the present invention the special effect is a painterly effect and the motion image display simulates the drawing and/or painting of the captured image. Examples of painterly effects filters such as watercolor, oil painting, sketches, drawing, pointillist effects, etc. are well known to those skilled in the art and can be found in commercial software packages such as Adobe Photoshop™ by Adobe Systems Incorporated. To produce the motion display according to the present invention, the results of these painterly effects filters are translated into motion image display effect that simulates the process of the image being created by an artist.

In general, artistic images are composed of either one or two basic components; an outline, and regions filled in with distinct colors. These two basic components are varied to produce various desired painterly effects. For example, a cartoon rendering of an image is composed of a hard outline image filled in with colors from a specified color palette usually containing saturated colors. A sketch rendering of an image is composed of only an outline image that can vary from being soft to hard in its appearance. A watercolor rendering of an image contains only regions filled in with distinct colors.

Figure 4:
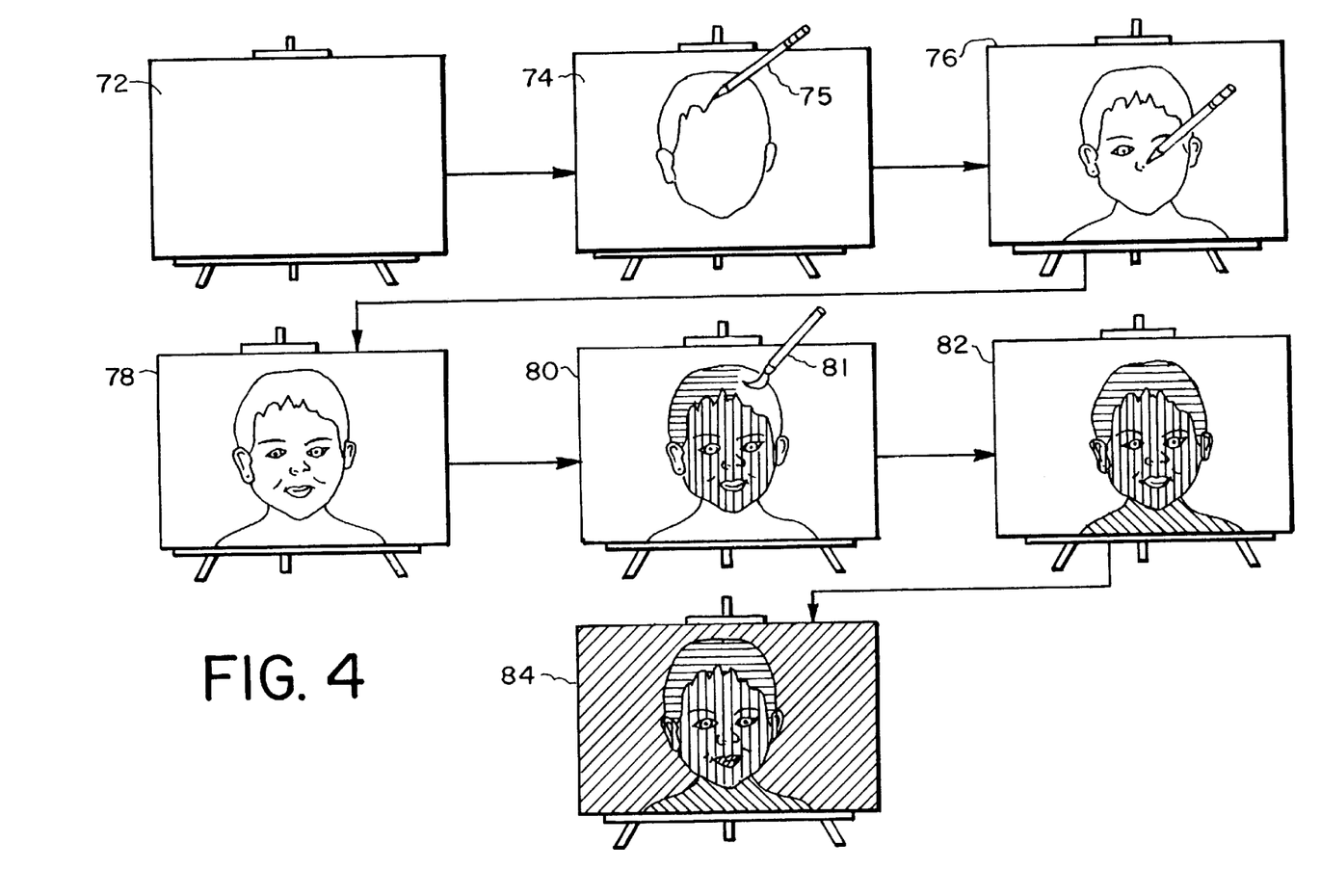
FIG. 4 is a screen illustrating a partially completed special effect being displayed in the photobooth.

Referring now to FIG. 4, the steps of displaying on the monitor the motion image display simulating the creation of a painterly effect according to one embodiment of the present invention will be described. After the customer has accepted her image, the image processing stage generates data which is used to simulate an artist rendering her image according to the desired painterly effect. Initially, the monitor would display an easel with a blank canvas 72. The outline image of the customer would be progressively sketched 74 and 76, showing the image of a moving pen or pencil 75 creating the outline image, until the completed outline image 78 is generated. The outline image is then progressively painted 80 and 82, showing the image of a moving paint brush 81, until the completed painted image 84 is generated. Alternatively, the order of the aforementioned steps can be reversed in which case the filled color regions are painted first and the outline image is added last. To enhanced the customer's experience during the motion image display, an artist's implement such as a pencil 75, or a brush 81, or a character holding the implement is used to simulate the creation of the artistic rendering. In addition, sound effects may be generated simulating the sound of artist's implements being manipulated on the natural media.

Figure 5:
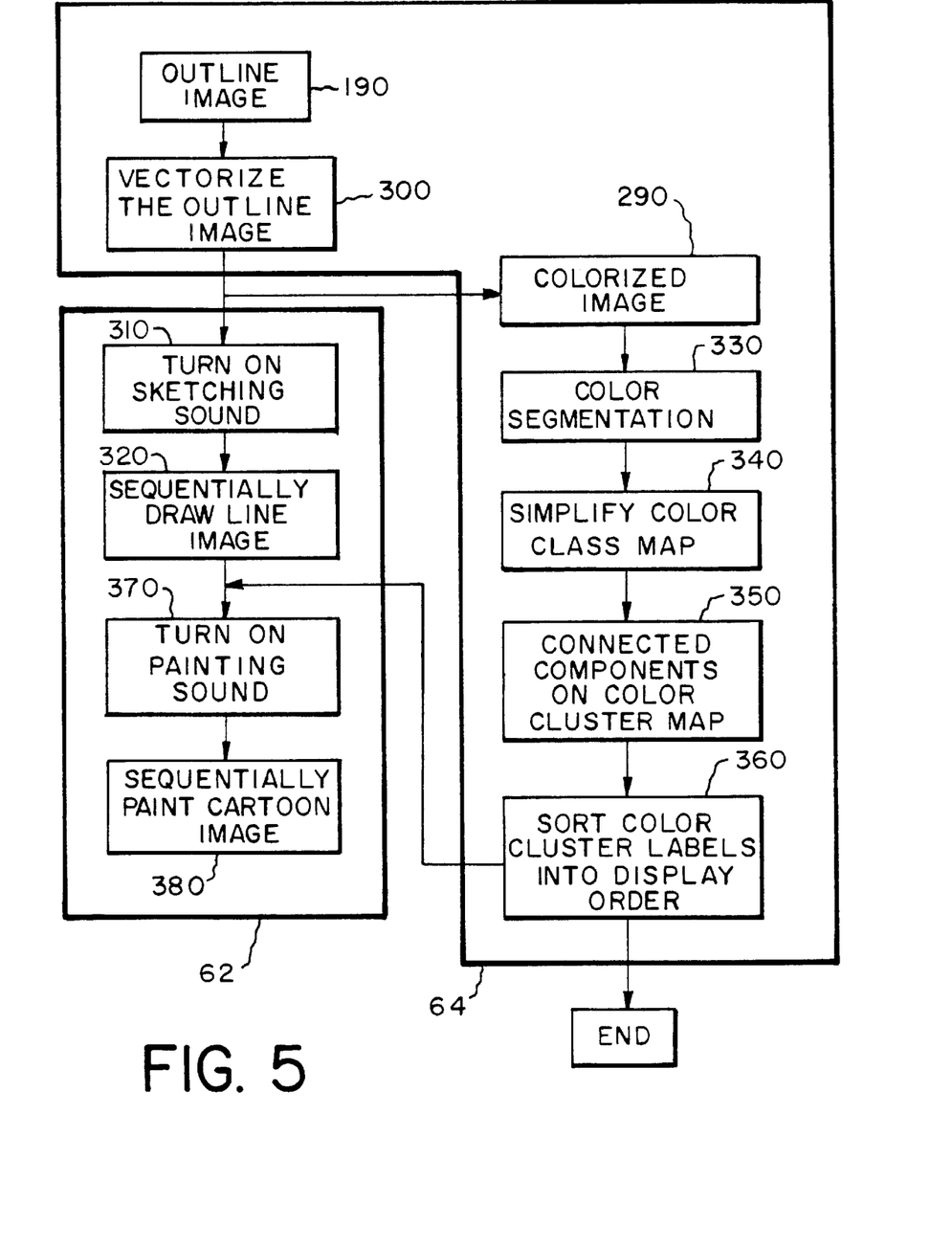
FIG. 5 is a flow chart showing the process for producing the motion image display.

Referring now to FIG. 5 the process of generating the motion image display of a cartoon-like painterly effect according to one embodiment of the present invention will be described. First, an outline of the digital image from the camera is converted to an outline image, for example using the edge filters from Adobe Photoshop. The image processing mode 64 (see FIG. 3) converts the outline image 190 from a raster image into a vector-like image 300 that links the pixels into continuous lines which are more suitable for simulating a realistic sketching of the outline image. Vectorization methods are well known to those skilled in the art. For example the methods disclosed in "Adaptive Vectorization of Line Drawing Images" by R. D. T. Janssen and A. M. Vossepoel, *Computer Vision and Image Understanding*, Vol. 65, No. 1, pp. 38–56, January 1997, are suitable for vectorizing line images. Alternatively, other image processing techniques such as connected component generation and/or graph traversal algorithms may be used for generating representations that are suitable for the motion image display. The display motion mode 62 is fed the vectorized image 300 which signals the computer 37 to turn on the sketching sound 310. The computer 37 sequentially draws the outline image 320 based on the vectorized outline image 300. The speed at which the outline image is drawn is modulated so as to simulate a realistic sketching of the outline image.

Figure 6:
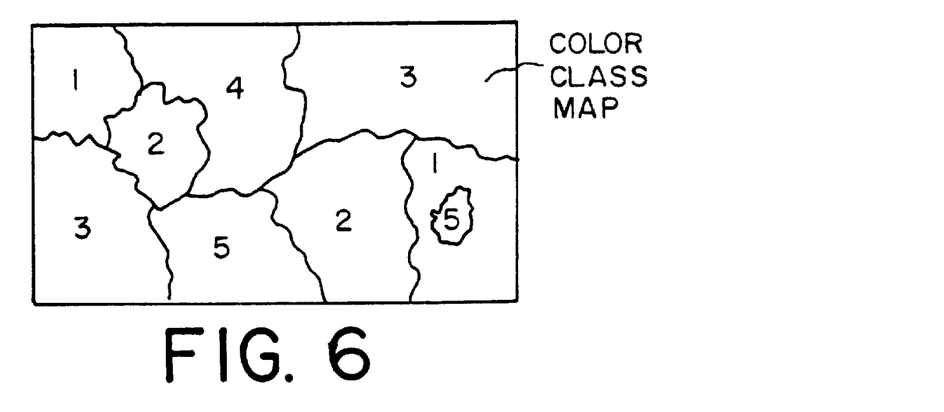
FIGS. 6–8 are diagrams useful in describing the painting process employed in the motion image display according to the present invention.
Figure 7:
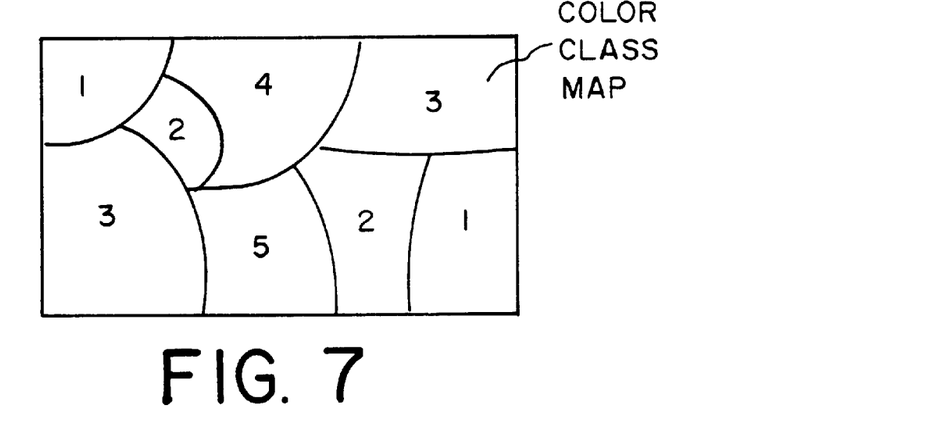

Image processing mode 64 subsequently generates the colorized image 290. The colorized image 290 is segmented into a number of n color classes 330. Color segmentation methods are well known to those skilled in the art. See for example "Adaptive Bayesian Segmentation of Color Images" by M. M. Chang, M. I. Sezan, and A. M. Tekalp, *Journal of Electronic Imaging*, Vol. 3(4), pp. 404–414, October 1994, for methods that are suitable for segmenting color images. In our preferred embodiment the color segmentation is run using CIELAB space to represent the colorized image. The color segmentation step produces a color class map (see FIG. 6) where each pixel is assigned to one of the n color classes (e.g. between 5 and 15 color classes). The number of color classes n should be chosen so that it simulates a painter's color palette. If the color segmentation algorithm 330 does not produce a spatially smooth color class map then a simplification operator 340 can be applied to the color class map. A smooth color class map (see FIG. 7) improves the realism of the motion image display of the image being painted. For an example of simplification operators see "Contour Simplification and Motion Compensated Coding" by C. Gu and M. Kunt, *Signal Processing: Image Communication*, Vol. 7, pp. 279–296, 1995.

Figure 8:
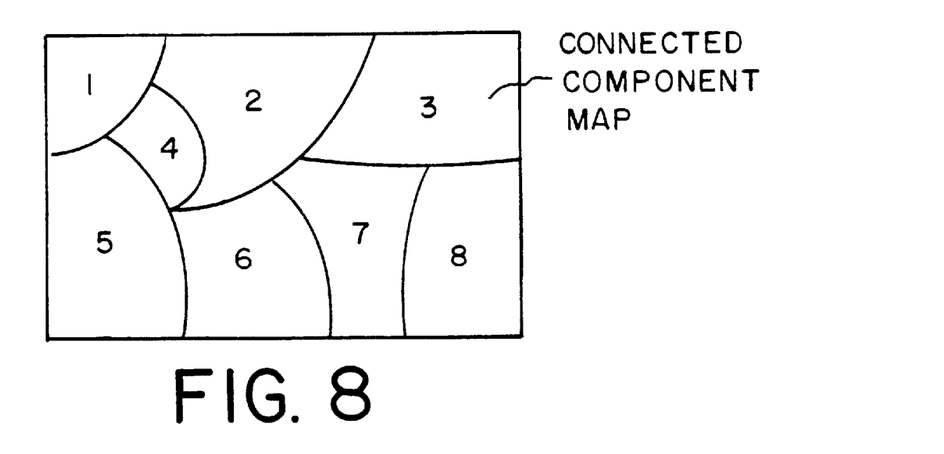

A connected components analysis is performed 350 on the color class map. The connected component step produces a connected component map (See FIG. 8) where pixels belonging to the same color class which are connected to each other are labeled into distinct components. The connected component map is similar to a paint by number plot, where pixels that belong to the same connected component are of the same color and the color class map identifies the color of each connected component in the paint by number plot. The color classes are then sorted 360 into the order in which they are to be painted on the screen. This order is referred to as the color order list. This is done to make the simulation of the painting of customer's image look more realistic.

In our preferred embodiment, for portrait type images, flesh regions are painted first followed by color classes that are located in the positive a*b* quadrant of CIE LAB colorspace, then neutrals, and then all other colors. When the background of a customer image is a solid color, preferably a saturated green or blue, its color class is painted last.

When the display motion mode 62 is finished sketching the outline image it is fed the processed painterly effect image, the color class map, the connected component map, and the color order list. The computer 37 turns on the painting sound 370 and uses the color class map, the connected component map, and color order list to decide when to paint each pixel in the processed painterly image 380. The pixels associated with each connected component of a given color class are painted one component at time in the order specified by the color order list. For example, in our preferred embodiment, the connected component regions which are associated with flesh color class are painted first, one component at a time. This process continues until the components of the last color class in the color order list have all been painted one component at a time. The red, green, blue (RGB) values displayed for each pixel is the RGB value associated with the same pixel in the painterly effect image. The brush paints the image more than one pixel at a time, using brush strokes that are many pixels wide, so as to simulate the shape and size of a real brush stroke. The speed at which the processed image is painted is modulated so as to simulate a realistic painting of the processed image.

The use of a chroma key background 51 can be used to help separate the customer's image from the background. The chroma key background can be replaced with a predrawn background which can be added to the painterly effect image of the subject. This predrawn background can be sketched and painted along with the image of the customer.

According to another embodiment of the current invention, the special effect is a morphing or warping of the customer's image, and the motion image display simulates a continuous morphing or warping of the image from the customer's captured image to the final morphed image. An example of a warp may be a predefined effect, such as a caricature effect (see for example "Synthesising Continuous-Tone Caricatures" by P. J. Benson and D. I. Perrett, *Image and Vision Computing*, vol. 9, no. 2, pp. 123–129, April 1991). Examples of morphing would be a partial morph to a known person or an animal (see for example "Feature-Based Image Metamorphosis" by T. Beier and S. Neely, *Computer Graphics*, 26, 2, July 1992), and aging or gender changing (see for example "Manipulating Facial Appearance through Shape and Color" by D. A. Rowland and D. I. Perrett, *IEEE Computer Graphics and Applications*, pp. 70–76, September 1995). In a morphing operation, control points are identified in the customer image and target image, and the morphing operation produces an anamorphic distortion of the customer image into the target image. If the morphing process is stopped prior to reaching the target image, the resulting image will display features of both the customer image and target image.

Automatic feature finding algorithms (for example see "Human Facial Feature Extraction for Face Interpretation and Recognition" by C. Huang and C. Chen, *Pattern Recognition*, Vol. 25, No. 12, pp. 1435–1444, 1992) can be used to identify the location of control points on the captured image of the customer to use in the morphing or warping of the customer's image. Alternatively, in order to make the process more robust, the customer can assist in the process of identifying the location of certain facial features such as the eyes and/or mouth as inputs to the automatic feature finding algorithm. This can be done using an input device such as touch screen (not shown) mounted on opening 22 (FIG. 2) or pointing device such as a mouse (not shown) to identify the location of the control points on the captured customer's image displayed on the monitor. Alternatively, a template such as two ovals, that represent the location of the eyes, can be displayed on the screen during the capture stage and the customer can be instructed to pose so that her eyes line up with the two ovals. Alternatively, the customer can be instructed to identify the location of all the control points needed to execute the morph or warp.

First, the morphing sequence is generated using the captured customer's image and the target image. Preferably, the last frame is generated first and sent to the printer. As the morphing frames in the sequence are generated, they are sequentially displayed. The frames are displayed at a rate such the morph or warp is completed at the time that the printer has finished printing the customer's image. In a preferred embodiment, a cartoon character is displayed that pulls and pushes the image of the customers face into the morphed state.

According to a further embodiment of the present invention, the special effect is an image of a sculpture. The image is processed to resemble a sculpture and the processed image is sent to the printer. While the image is printing, a motion image is generated showing a cartoon character creating the sculpture, using sculpture tools such as a hammer and chisel. The motion image is timed so that the sculpture is finished when the printing of the picture is complete.

According to a further embodiment of the invention, the output of the printer 50 is a lenticular motion image, showing a portion of the motion image display. For an example of a printer capable of producing a lenticular image, see "Development of Motion Image Printer" by H. Akahori et al., *IS&T's* 50th Annual Conference, 1996. For a lenticular motion image, the successive frames in a motion sequence are interleaved in the lenticular image, and the image is viewed with the lenticles arranged horizontally. The lenticular image is tipped to sequentially view the images in the motion image sequence.

The invention has been described with reference to a preferred embodiment. However, it will be appreciated that variations and modifications can be effected by a person of ordinary skill in the art without departing from the scope of the invention.

PARTS LIST 10 photobooth
12 open portion
14 closed portion
16 seat
20 image capture system
22 opening
26 mirror
28 display monitor
30 side of mirror facing customer
32 side of mirror away from customer
33 optical axis
34 center area
36 video camera
37 computer
38 payment acceptance device
42 speakers
43 lights
44 keyboard
50 color hardcopy output device
51 chromakey screen
52 second monitor
54 attract mode
56 payment mode
58 capture mode
60 accept/reject mode
62 display motion mode
64 image processing mode
66 printing mode
68 print delivery mode
70 restart mode
71 chute
72 blank easel
74 partially sketched image
75 pencil
76 partially sketched image
78 completed sketch
80 partially painted image
81 paint brush
82 partially painted image
84 completed painted image
190 outline image
290 colorized image
300 vectorize outline image step
310 turn on sketching sound
320 sequentially draw outline image step
330 color segmentation step
340 simplify color class map step
350 connect components step
360 sort color cluster label step
370 turning on painting sound
380 sequentially paint image

I claim:

1. A photobooth, comprising:
   an electronic camera for capturing and producing a digital image of a customer;
   an image processing computer for processing the digital image to apply a special effect to the image;
   a display for displaying the processed digital image to the customer;
   a printer for printing the processed digital image; and
   means for producing a motion image display simulating the sequential production of the processed image and displaying the motion image while the image is being processed and printed.

2. The photobooth claimed in claim 1, wherein the special effect is a painterly effect and the motion image display simulates the painting of the image.

3. The photobooth claimed in claim 2, wherein the motion image display simulates a character painting the image.

4. The photobooth claimed in claim 1, where the special effect is a cartoon effect.

5. The photobooth claimed in claim 1, wherein the special effect is a morphing or warping of the customer's image and the image display simulates a continuous morphing or warping of the image.

6. The photobooth claimed in claim 5, wherein the display shows a character actively morphing or warping the image.

7. The photobooth claimed in claim 1, wherein photobooth includes a loudspeaker and the motion display is accompanied by sound effects produced by the loudspeaker.

8. The photobooth claimed in claim 7, wherein the sound effects are the sounds of art materials being manipulated.

9. The photobooth claimed in claim 1, wherein the means for producing a motion display further comprises means for producing an interactive display featuring a character that interacts with the customer.

10. The photobooth claimed in claim 9, wherein the interactive display character simulates taking the image, and producing the image.

11. The photobooth claimed in claim 9, wherein the photobooth includes a loudspeaker and the motion display includes sound effects produced by the loudspeaker.

12. The photobooth claimed in claim 11, wherein the sound effects include speech from the character.

13. The photobooth claimed in claim 12, further including a microphone and speech recognition means connected to the microphone for interacting with the customer by speech.

* * * * *